US009299201B2

(12) United States Patent
Yuen et al.

(10) Patent No.: US 9,299,201 B2
(45) Date of Patent: Mar. 29, 2016

(54) ACQUISITION OF IN-VEHICLE SENSOR DATA AND RENDERING OF AGGREGATE AVERAGE PERFORMANCE INDICATORS

(75) Inventors: Pui-Kei Yuen, Oakville, CA (US); Roger A. Clark, Clarkston, MI (US); William M. Studzinski, Shelby Township, MI (US); Martin Hans Krueger, Rochester Hills, MI (US); Elizabeth S. Nunning, Troy, MI (US); Roland Matthe, Bischofsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 840 days.

(21) Appl. No.: 13/267,478

(22) Filed: Oct. 6, 2011

(65) Prior Publication Data

US 2013/0090790 A1 Apr. 11, 2013

(51) Int. Cl.
*B60L 3/00* (2006.01)
*G07C 5/08* (2006.01)
*G07C 5/00* (2006.01)

(52) U.S. Cl.
CPC . *G07C 5/08* (2013.01); *G07C 5/008* (2013.01)

(58) Field of Classification Search
CPC .......... G07C 5/00; G07C 5/004; G07C 5/008; G07C 5/08; G07C 5/0816; G01C 22/00; G01C 21/3697; B60W 40/09; B60K 2350/1092; B60L 2270/10; Y02T 10/80
USPC .......... 701/1, 22, 29.3, 31.4, 32.1, 32.7, 33.4, 701/123
See application file for complete search history.

(56) References Cited

U.S. PATENT DOCUMENTS

| | | | | |
|---|---|---|---|---|
| 7,096,131 | B2 * | 8/2006 | Takase et al. | 702/63 |
| 7,497,191 | B2 * | 3/2009 | Fulton et al. | 123/3 |
| 7,580,808 | B2 | 8/2009 | Bos | |
| 8,346,420 | B2 | 1/2013 | Tarnowsky et al. | |
| 8,712,650 | B2 * | 4/2014 | Koebler et al. | 701/51 |
| 2001/0034576 | A1 * | 10/2001 | Vojtisek-Lom | 701/102 |
| 2004/0093264 | A1 * | 5/2004 | Shimizu | 705/13 |
| 2005/0027592 | A1 | 2/2005 | Pettigrew et al. | |
| 2007/0247291 | A1 * | 10/2007 | Masuda et al. | 340/439 |
| 2008/0015975 | A1 * | 1/2008 | Ivchenko et al. | 705/37 |

(Continued)

FOREIGN PATENT DOCUMENTS

| | | | |
|---|---|---|---|
| CN | 101387577 | A | 3/2009 |
| CN | 101886940 | A | 11/2010 |

(Continued)

OTHER PUBLICATIONS

Chinese Office Action for related Chinese Application No. 201210548333.9 dated Nov. 15, 2014; 7 pages.

*Primary Examiner* — Thomas G Black
*Assistant Examiner* — Ce Li
(74) *Attorney, Agent, or Firm* — Cantor Colburn LLP

(57) ABSTRACT

Data collection and analysis processes include collecting energy consumption data from an in-vehicle energy source sensor, collecting emissions data from an in-vehicle emissions sensor, the emissions data reflecting emissions produced by a vehicle, and collecting mileage data from a mileage sensor in the vehicle. The data collection and analysis processes also include processing the energy consumption data and the emissions data as a function of the mileage data, calculating an efficiency rating from the processing, and transmitting results of the processing to a data collection system.

19 Claims, 3 Drawing Sheets

(56) References Cited

U.S. PATENT DOCUMENTS

| | | | | |
|---|---|---|---|---|
| 2009/0099724 | A1* | 4/2009 | Kranz et al. | 701/35 |
| 2009/0228403 | A1* | 9/2009 | Elam et al. | 705/412 |
| 2010/0050993 | A1* | 3/2010 | Zhao et al. | 123/481 |
| 2010/0076878 | A1* | 3/2010 | Burr et al. | 705/34 |
| 2010/0321213 | A1 | 12/2010 | Mattila et al. | |
| 2011/0099489 | A1* | 4/2011 | Glenn et al. | 715/764 |
| 2011/0144839 | A1* | 6/2011 | Pudar | 701/22 |
| 2011/0166773 | A1* | 7/2011 | Raz et al. | 701/123 |
| 2011/0251750 | A1* | 10/2011 | Fields et al. | 701/32 |
| 2011/0258044 | A1* | 10/2011 | Kargupta | 705/14.49 |
| 2012/0109579 | A1* | 5/2012 | Kersey et al. | 702/182 |
| 2012/0139922 | A1* | 6/2012 | Heo | 345/440 |
| 2012/0143484 | A1* | 6/2012 | Sawada | 701/123 |
| 2012/0215491 | A1* | 8/2012 | Theriot et al. | 702/183 |
| 2012/0296549 | A1* | 11/2012 | Adams | 701/102 |
| 2012/0323499 | A1* | 12/2012 | Yelin et al. | 702/24 |
| 2013/0054281 | A1* | 2/2013 | Thakkar et al. | 705/5 |

FOREIGN PATENT DOCUMENTS

| | | | |
|---|---|---|---|
| CN | 101933345 | A | 12/2010 |
| CN | 201749550 | U | 2/2011 |
| CN | 102201133 | A | 9/2011 |

* cited by examiner

300

ACQUISITION OF IN-VEHICLE SENSOR DATA AND RENDERING OF AGGREGATE AVERAGE PERFORMANCE INDICATORS

FIELD OF THE INVENTION

The subject invention relates to data processing and, more specifically, to the acquisition of in-vehicle sensor data and rendering of aggregate average performance indicators.

BACKGROUND

One of the most often discussed challenges surrounding the automotive and energy industries are balancing personal mobility with sustainability, environmental and emission impacts of energy usage. Many enterprises, researchers, and government agencies strive to find solutions to the limited energy resources and the issues surrounding these environmental and emissions impacts.

In the automotive industry, many vehicles are designed and strategies developed for use with low emissions alternative fuels (e.g., CNG, LPG, Dimethyl Ether (DME)), renewable fuels (e.g., ethanol, biobutanol, biodiesel), or energy sources (e.g., electric and hybrid systems) in order to conserve energy and reduce the country's dependence on foreign oil.

With the growing use of a wider array of energy sources today, it is desirable to comprehensively and quantitatively evaluate the performance and emissions impacts of these differing energy conserving vehicle hardware strategies and components.

SUMMARY OF THE INVENTION

In one exemplary embodiment of the invention, a system for acquisition of in-vehicle sensor data is provided. The system includes a computer processor and logic, executable by the computer processor. The logic is configured to implement a method. The method includes collecting energy consumption data from an in-vehicle energy source sensor, collecting emissions data from an in-vehicle emissions sensor, and collecting mileage data from a mileage sensor. The method also includes processing the energy consumption data and the emissions data as a function of the mileage data, calculating an efficiency rating from the processing, and transmitting summarized data to a data collection system.

In another exemplary embodiment of the invention, a method for acquisition of in-vehicle sensor data from a vehicle is provided. The method includes collecting energy consumption data from an in-vehicle energy source sensor, collecting emissions data from an in-vehicle emissions sensor, and collecting mileage data from a mileage sensor. The method also includes processing the energy consumption data and the emissions data as a function of the mileage data, transmitting results of the processing to a data collection system.

In yet another exemplary embodiment of the invention, a computer program product for acquisition of in-vehicle sensor data from a vehicle is provided. The computer program product includes a computer storage medium embodied with instructions, which when executed by a computer cause the computer to implement a method. The method includes collecting energy consumption data from an in-vehicle energy source sensor, collecting emissions data from an in-vehicle emissions sensor, and collecting mileage data from a mileage sensor. The method also includes processing the energy consumption data and the emissions data as a function of the mileage data, calculating an efficiency rating from the processing, and transmitting results of the processing to a data collection system.

The above features and advantages and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
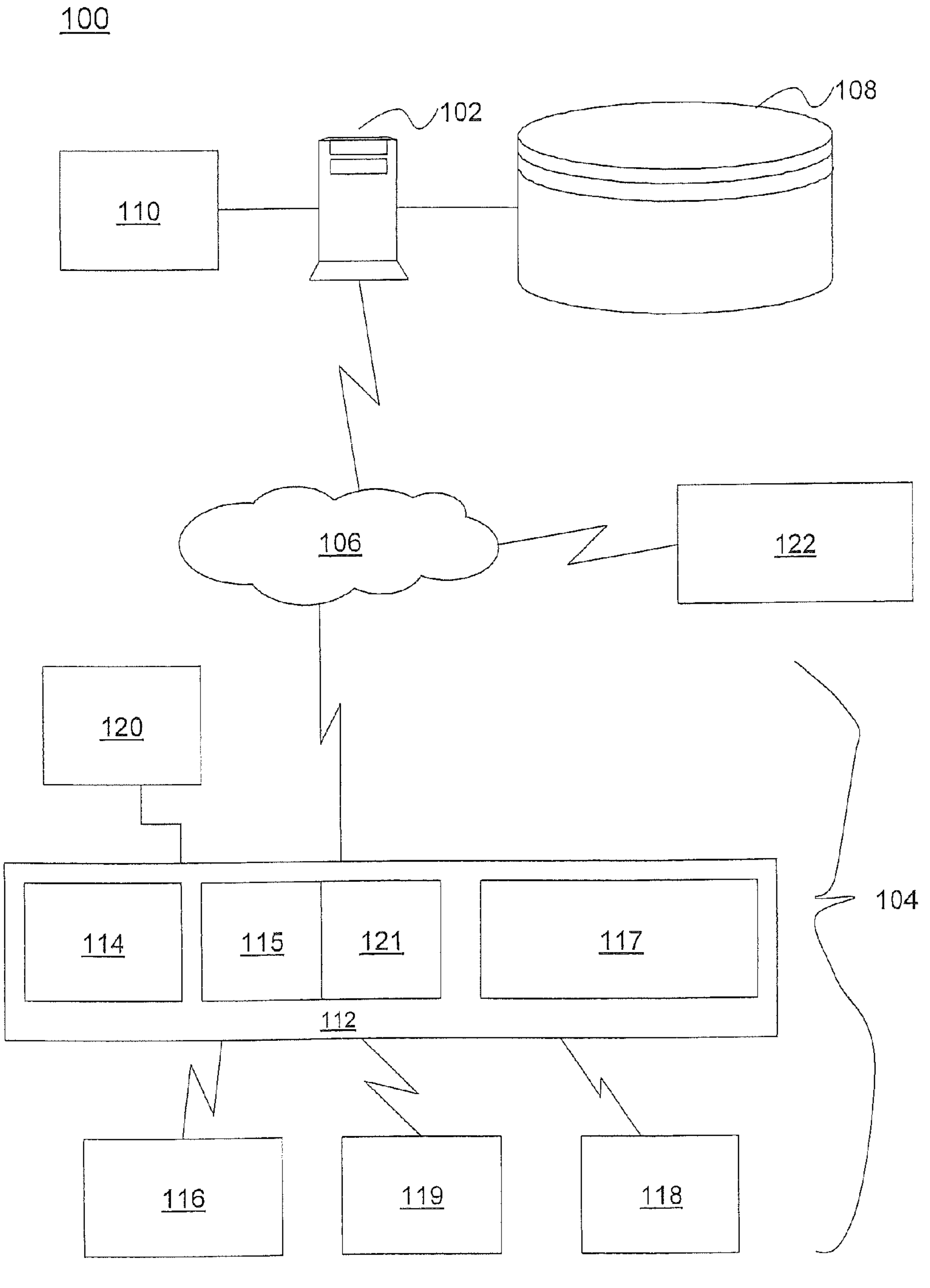
FIG. 1 illustrates a block diagram of a system upon which in-vehicle data collection and analysis processes may be implemented in an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, in-vehicle data collection and analysis processes collect energy consumption data from various vehicle energy consumption sensors, emissions data from emissions sensors, and mileage data. The data collection and analysis processes calculate in real time an efficiency value derived from the energy consumption data, the emissions data, and accrued mileage. The data collection and analysis processes provide this information to the vehicle operator, e.g., via an onboard vehicle display. The efficiency value may be a real time proportion of fuel and/or energy efficiency enabled and/or reduced by the vehicle's fuel conserving and emissions reduction technology to quantify the energy and/or emissions savings.

The in-vehicle data collection and analysis processes further enable a centralized data collection facility to aggregate energy consumption, emissions, and mileage data received over one or more networks from a plurality of vehicles, and analyze the data to evaluate overall performance and emissions information. This data then can be used in future vehicle design, reporting obligations to emissions regulatory agencies, and statistical information on the vehicle manufacturer's actual overall energy and emissions conserving efforts as compared to other vehicle manufacturer's predicted efforts. Likewise, consumers may want to know that the vehicle investment they have made has environmental benefits and, therefore, an in-vehicle message or counter can be displayed that provides the actual green house gas (GHG) reducing benefits for their choices, for both their vehicle choice and fuel choice, such as E85 or energy choices. The aggregated information may be used to summarize a GHG emissions reduction footprint that can be used to identify and vehicles benefiting from lowered carbon emissions and to potentially modify vehicle design methods to enhance these benefits across various vehicle makes and models.

Turning now to FIG. 1, an exemplary system 100 upon which the in-vehicle data collection and analysis processes may be implemented will now be described.

In an exemplary embodiment, the system 100 includes a host system 102 and a vehicle 104 in communication over one or more networks 106. The host system 102 may be implemented by a facilitator of the in-vehicle data collection and analysis processes. In one embodiment, the host system 102 is a data collection server that collects vehicle usage and related data over the networks 106 from a number of vehicles, such as the vehicle 104. The host system 102 executes logic 110 for implementing in-vehicle data collection and analysis processes. The host system 102 may be a high-speed computer processing device, such as a mainframe computer, to manage the volume of operations governed by an entity for which the in-vehicle data collection and analysis processes is executing.

The host system 102 further includes a storage device 108. The storage device 108 includes a data repository with data relating to the in-vehicle data collection and analysis processes, such as aggregated energy source usage data and summarized usage and analysis reports, as well as other data/information desired by the entity representing the host system 102 of FIG. 1. The storage device 108 may be logically addressable as a consolidated data source across a distributed environment that includes networks 106. Information stored in the storage device 108 may be retrieved and manipulated via the host system 102.

The vehicle 104 may include any transport device, such as an automobile or commercial vehicle. The vehicle 104 includes a communications device 112, energy source sensors 116, mileage sensor 118, emissions sensors 119, and a display screen 120. As illustrated in the system 100 of FIG. 1, only a portion of the vehicle 104 is shown.

The communications device 112 includes a computer processor 115, memory 114, and communication components 117. The communication components 117 may include devices that communicate with energy source sensors 116, mileage sensor 118, emissions sensors 119, and display 120 using short-range communications protocols, such as BlueTooth™. The communication components 117 may also include devices that communicate with networks 106 using long-range protocols, such as cellular data transfer protocols and/or wireless telematics data transfer protocols. For example, a portion of the communications device 112 may be implemented using an existing service, such as OnStar® and global positioning system (GPS) technologies. The computer processor 115 may be configured with logic 121 for collecting the sensor and mileage data and processing the data collected, as described herein. The sensor and mileage data may be stored internally in the memory 114 of the communications device 112. The communications device 112 may form part of a control system of the vehicle 104.

The energy source sensors 116 measure the amount of energy, such as fuel consumption, used by the vehicle 104. The energy source sensors 116 may also measure sources of energy, such as energy produced and measured by speed and torque values, as well as electrical units, such as HVAC systems. Based on the type of fuel used by the vehicle 104, the energy source sensors 116 may measure the consumption of conventional fuels, such as petroleum and diesel fuels. Alternatively, the type of fuel used by vehicle 104 may be an alternate fuel, such as bio-diesel (e.g., soy-based or waste grease), or ethanol (e.g., corn ethanol, cellulosic ethanol, advanced ethanol, etc.). In a further alternative, the vehicle may be an electric vehicle that is powered by electricity. In this embodiment, the energy source sensors 116 may include an electric motor control unit and an electrical charging power meter. The amount of energy consumed may be determined from data acquired from the electric motor and battery charging data that indicate, e.g., peak charging times versus off-peak charging times. The energy source sensors 116 communicate the fuel or energy consumption information to the communications device 112, e.g., via the communications components 117.

The emissions sensors 119 measure exhaust or exhaust oxygen consumption by the vehicle's 104 exhaust components. The emissions data may be reflected in terms of green house gas (GHG), or CO2, emissions. The emissions sensors 119 communicate the emissions data to the communications device 112, e.g., via the communication components 117.

The mileage sensor 118 monitors the mileage accrued by the vehicle 104 during its operation. The mileage sensor 118 communicates the accrued mileage to the communications device 112.

The energy consumption data, emissions data, and accrued mileage can be communicated to the communications device 112 in real time (e.g., ongoing transmission of the energy consumption data, emissions data, and mileage data). Alternatively, this data may be transmitted to the communications device 112 in time increments, based on a number of miles driven, or other event.

The display 120 may be implemented as an LCD (liquid crystal display) or plasma screen and may be part of an existing navigation system of the vehicle 104. The display 120 is communicatively coupled to the communications device 112 in order to receive energy consumption and emissions data processed by the communications device 112.

The system 100 also includes a vehicle diagnostic system 122. The vehicle diagnostic system 122 performs repairs, diagnostics, inspections, or other types of evaluations on vehicles and includes computer processing components that gather data from the vehicles as part of its evaluation process. For example, a vehicle diagnostic system 122 may be a computer device and software that is coupled to various components (e.g., fuel gauge, motor, battery, and related sensors) of the vehicle 104 and data is transmitted from the vehicle components to the computer device. In one embodiment, the data collected by the vehicle diagnostic system 122 may be downloaded by the communications device 112 and/or may be uploaded directly to the host system 102 over one or more of networks 106.

The networks 106 may include any type of known networks including, but not limited to, a wide area network (WAN), a local area network (LAN), a global network (e.g., Internet), a virtual private network (VPN), and an intranet. The networks 106 may be implemented using wireless networks or any kind of physical network implementation known in the art. The host system 102, vehicle 104, and vehicle diagnostic system 122 may be collectively coupled to one another through multiple networks (e.g., Internet, digital or satellite broadcast, cellular, etc.) so that not all of the host system 102, vehicle 104, and vehicle diagnostic system 122 are coupled through the same network.

Figure 2:
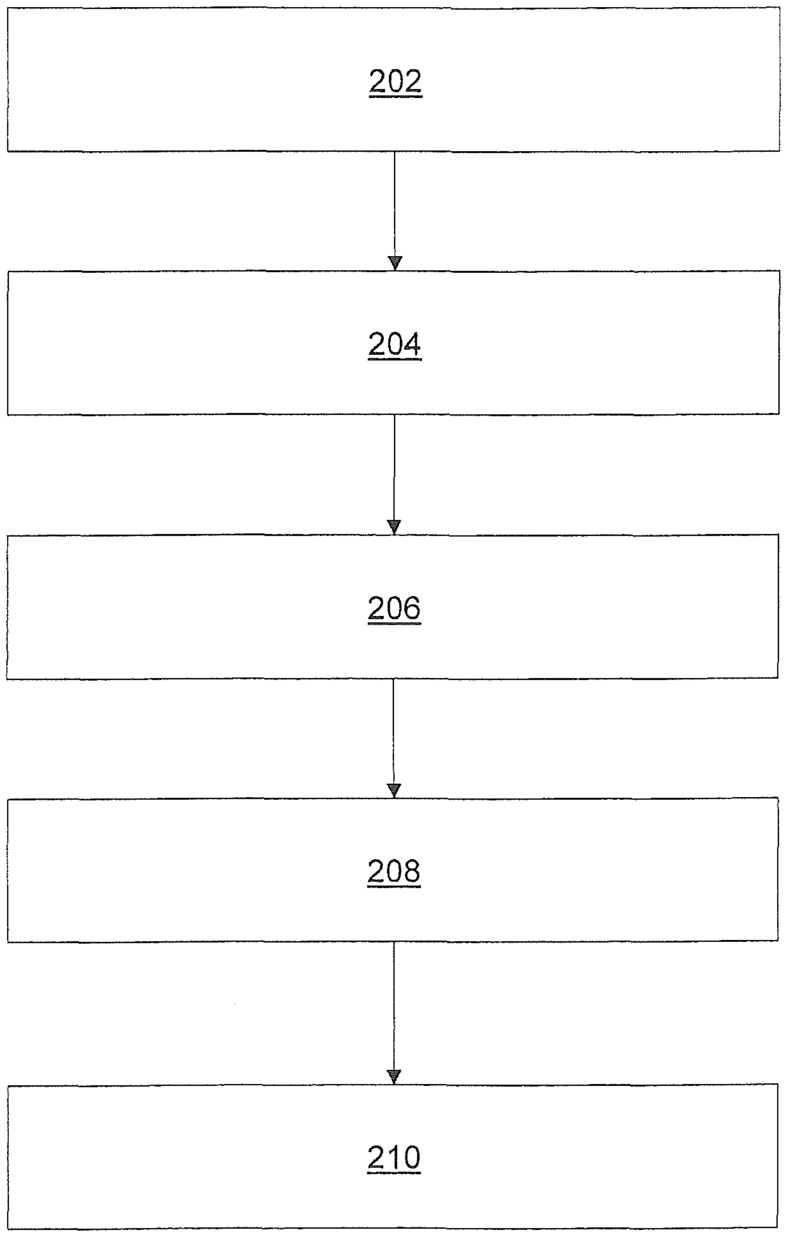
FIG. 2 illustrates a flow diagram describing a process for implementing in-vehicle data collection and analysis processes in an exemplary embodiment.

As indicated above, the exemplary in-vehicle data collection and analysis processes provide data related to energy consumption and other sensor data for a variety of types of vehicle sensors that enables the in-vehicle data collection and analysis processes. Turning now to FIG. 2, a flow diagram describing a process for implementing the in-vehicle data collection and analysis processes will now be described in an exemplary embodiment.

At step 202, the communications device 112 collects energy source sensor data from on-board energy source sensors 116, emissions sensors 119, as well as mileage data from mileage sensor 118 at step 204. The data collected in steps 202 and 204 may be processed at step 206. For example, an example of processed data is shown as follows:

BEGIN TIME: Jan. 1, 2011

END TIME: Jan. 8, 2011

MILES DRIVEN: 135 miles

PETROLEUM CONSUMED: 15 gallons

AMOUNT OF RENEWAL/ALTERNATIVE FUEL CONSUMED: x units

TYPE OF RENEWABLE OR ALTERNATIVE FUEL CONSUMED: x units

ELECTRICITY CONSUMED: 1,031 units

TYPE OF ELECTRICITY CONSUMED (PEAK/OFF PEAK IN UNITS)

The data can be compared with previously collected data from a different time range to understand differences in the amount of fuel consumed.

For flex-fuel vehicles for example, the fuel sensor and exhaust oxygen sensor can calculate an accurate measurement of the amount of equivalent gallons of renewable ethanol the driver has used, as well as the amount of petroleum avoided (e.g., in barrels or gallons).

The energy source sensor data and the emissions data are processed as a function of the accrued mileage. As the mileage increases, the amount of energy consumed and emissions also increase. However, when the vehicle 104 operator makes various driving decisions, the proportion of energy consumption and emissions relative to the accrued mileage can increase or decrease at different rates. For example, if the operator recharges the battery on his electric vehicle during off-peak hours, the energy consumption rate may be decreased as compared with a scenario in which the battery is recharged at peak rates. In addition, an aggressive driver tends to consume more fuel per mile than a passive driver. These, and other driver-controlled factors, can influence the overall efficiency and performance of the vehicle 104. Additionally, if the vehicle 104 utilizes active fuel management (AFM) components, the energy savings accrued from the use thereof may be factored into the processing described above in determining efficiency and performance of the vehicle 104. AFM refers to a feature in which the vehicle 104 actively shuts down some of vehicle's 104 engine cylinders during specified operating conditions in order to conserve fuel.

At step 208, the processed data may be presented to the vehicle 104, e.g., via the display device 120. In addition to providing information about the vehicle's 104 performance, the data collection and analysis processes may also be configured to calculate and display the usage data captured and processed for the vehicle in relation to performance data captured for an aggregate of similar vehicles in order to inform the vehicle operator of his/her usage consumption/efficiency relative to some calculated average. This type of information may be useful, e.g., in demonstrating the differences in efficiency between aggressive drivers (e.g., those who wide-open throttle accelerate at every stop light, or who regularly operate at a number of miles over the speed limit) and passive drivers (e.g., those who accelerate at a slower pace and do not exceed the speed limit). The data collection and analysis processes may be configured to display a report for the operator that provides an actual GHG footprint in CO2 production (tons/month), as well as a report on amount of energy conserved relative to a calculated average. The drivers that are below the identified averages may feel a sense of pride and reward knowing they are participating in helping to reduce the average energy consumption, as well as to remind them of their driving habits and fuel selection choices.

At step 210, the data collected is transmitted by the communications device 112 over networks 106 to the host system 102. The host system 102 aggregates the data and performs calculations to evaluate overall performance and emissions information. In an exemplary embodiment, the host system 102 implements logic 110 to generate aggregate alternative fuels and energy usage data in vehicles in order to summarize a green house gas emissions reduction footprint. The usage data may be generated for a per-mile traveled or percentage basis. Benefits associated with lowered carbon emissions can be more readily assessed from this information.

The data can be compared to the average vehicle/driver within a specific group of vehicles, e.g., All Volt™ drivers, all large truck drivers, all hybrid drivers, as well as comparisons across vehicle segments, such as Volts™ versus pick up trucks, and CNG versus diesel fuel, in terms of CO2 produced or energy conserved.

Figure 3:
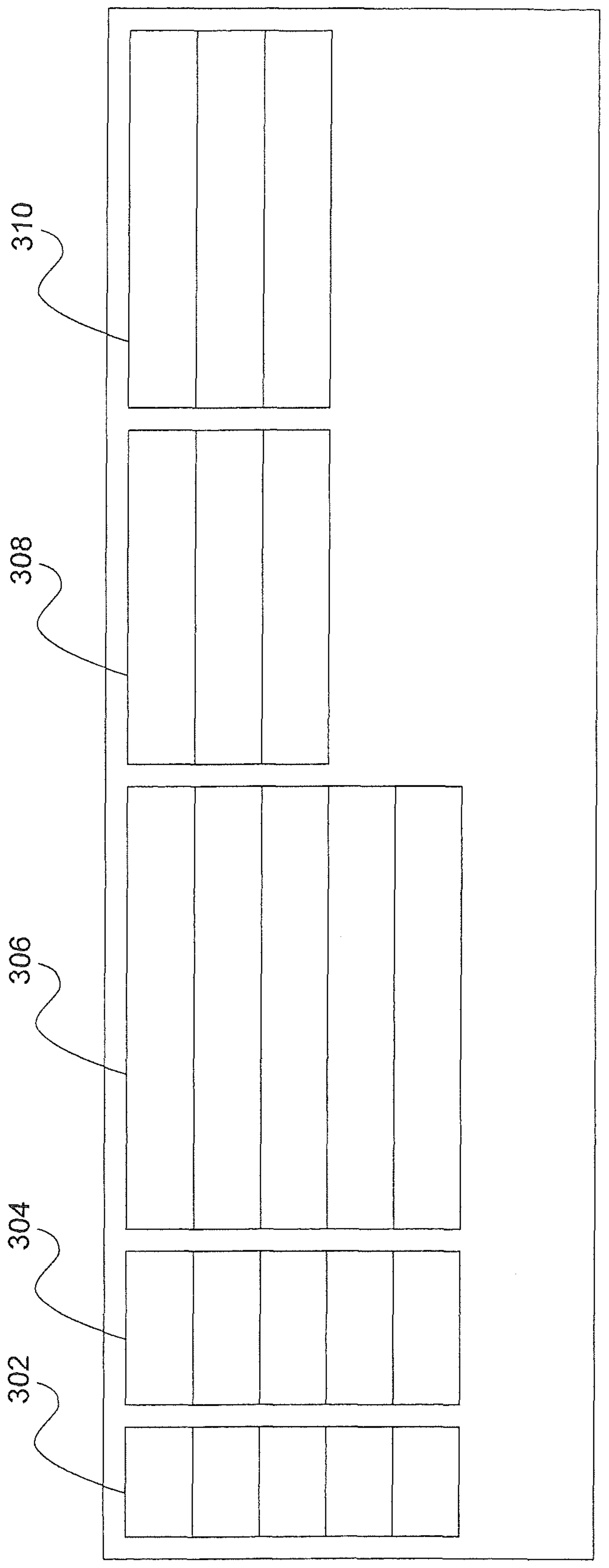
FIG. 3 depicts a record with sample data reflecting the output of in-vehicle data collection and analysis processes in an exemplary embodiment.

Turning now to FIG. 3, a sample record 300 illustrating results of the data collection and analysis processes will now be described. The record 300 may be useful for vehicle manufacturers in assessing the overall efficiency of each of its models over a span of time. Likewise, the environmental regulatory agencies may find useful the emissions and energy consumption data useful in the record 300. Vehicle consumers may also desire this information in making environmentally friendly decisions in car purchases.

As shown in FIG. 3, the record 300 breaks down the processed data by vehicle manufacturer 302 and model 304, followed by energy consumption averages 306, emissions averages 308, and resulting efficiency ratings 310. It will be understood that a host of other types of data may be reflected in the record 300, such as, e.g., instantaneous CO2 (g/mile) produced, average CO (g/mile) produced, cumulative CO2 (ton/month) produced, and other data as desired.

Technical effects include aggregating fuel consumption and mileage data from a plurality of vehicles, aggregating and analyzing the data to evaluate overall performance and emissions information. The aggregated information is used to summarize a green house gas emissions reduction footprint that can be used to identify and vehicles benefiting from lowered carbon emissions and to potentially modify vehicle design methods to enhance these benefits across various vehicle makes and models.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the application.

What is claimed is:

1. A system for acquisition of in-vehicle sensor data from a vehicle, comprising:

a computer processor; and logic executable by the computer processor, the logic configured to implement a method, the method comprising:

collecting energy consumption data from an in-vehicle energy source sensor;

collecting emissions data from an in-vehicle emissions sensor, the emissions data reflecting emissions produced by the vehicle;

collecting mileage data from a mileage sensor in the vehicle;

processing the energy consumption data and the emissions data as a function of the mileage data to calculate results, the results comprising an efficiency rating based on a real time fuel utilization controlled by fuel conserving and emissions reduction technology of the vehicle;

transmitting the results of the processing to a data collection system;

receiving aggregate performance data from the data collection system, the aggregate performance data representing an aggregation of energy consumption data processed for multiple vehicles;

generating a report on amount of green house gas reduced by the vehicle based on the results and the aggregate performance data, the report relating the efficiency rating to the aggregate performance data to inform a vehicle operator of a usage consumption relative to a calculated average across the multiple vehicles, the report comprises vehicle manufacturer and model data with respect to the aggregate performance data and the results; and displaying the report on a display in the vehicle.

2. The system of claim 1, wherein the in-vehicle energy source sensor is one of a petroleum-based, an alternate fuel sensor, an electric motor control unit, and a diesel-based fuel sensor.

3. The system of claim 1, wherein the method further comprises:

displaying the results and the efficiency rating on a display in the vehicle.

4. The system of claim 3, wherein collecting the energy consumption data, the emissions data, and the mileage data includes downloading the energy consumption data, the emissions data, and the mileage data from a vehicle diagnostic system communicatively coupled to the vehicle; and wherein displaying the report to a display in the vehicle is performed in response to receiving the energy consumption data, the emissions data, and the mileage data from the vehicle diagnostic system.

5. The system of claim 1, wherein the results are transmitted to the data collection system via a communications device resident in the vehicle.

6. The system of claim 1, wherein the logic further implements:

receiving averaged energy consumption data from the data collection system, the averaged energy consumption data representing an aggregation of energy consumption data processed for multiple vehicles;

generating a report on amount of energy conserved relative to the averaged energy consumption data; and displaying the report on the amount of energy conserved relative the averaged energy consumption a display in the vehicle.

7. The system of claim 1, wherein the fuel conserving and emissions reduction technology is an active fuel management subsystem that actively shuts down at least one of a plurality of engine cylinders of the vehicle during specified operating conditions.

8. A method for acquisition of in-vehicle sensor data from a vehicle, comprising:

collecting energy consumption data from an in-vehicle energy source sensor, the energy consumption data including alternate fuel consumption data;

collecting emissions data from an in-vehicle emissions sensor, the emissions data reflecting emissions produced by the vehicle;

collecting mileage data from a mileage sensor in the vehicle;

processing the energy fuel consumption data and the emissions data as a function of the mileage data to calculate results, the results comprising an efficiency rating based on a real time fuel utilization controlled by fuel conserving and emissions reduction technology of the vehicle;

transmitting the results of the processing to a data collection system;

receiving aggregate performance data from the data collection system, the aggregate performance data representing an aggregation of energy consumption data processed for multiple vehicles;

calculating an amount of petroleum consumption avoided by the vehicle by using alternate fuel based on the results and the aggregate performance data, the amount of petroleum consumption avoided relating the efficiency rating to the aggregate performance data to inform a vehicle operator of a usage consumption relative to a calculated average across multiple vehicles with respect to vehicle manufacturer and model data; and displaying the amount of petroleum usage avoided on a display in the vehicle.

9. The method of claim 8, wherein the in-vehicle energy source sensor is one of a(n):

petroleum-based fuel sensor;

diesel-based fuel sensor;

electric motor control unit; and alternative fuel sensor.

10. The method of claim 8, wherein the method further comprises:

displaying the results and the efficiency rating on a display in the vehicle.

11. The method of claim 10, wherein collecting the energy consumption data, the emissions data, and the mileage data includes downloading the energy consumption data, the emissions data, and the mileage data from a vehicle diagnostic system communicatively coupled to the vehicle; and wherein displaying the results to a display in the vehicle is performed in response to receiving the energy consumption data, the emissions data, and the mileage data from the vehicle diagnostic system.

12. The method of claim 8, wherein the results are transmitted to the data collection system via a communications device resident in the vehicle.

13. The method of claim 8, further comprising:

receiving averaged energy consumption and emissions data from the data collection system, the averaged energy consumption and emissions data representing an aggregation of energy consumption data and emissions data processed for multiple vehicles; and displaying the averaged energy consumption and emissions data on a display in the vehicle.

14. A computer program product for acquisition of in-vehicle sensor data from a vehicle, the computer program product includes a non-transitory computer storage medium embodied with instructions, which when executed by a computer cause the computer to implement a method comprising:

collecting energy consumption data from an in-vehicle energy source sensor;

collecting emissions data from an in-vehicle emissions sensor, the emissions data reflecting emissions produced by the vehicle;

collecting mileage data from a mileage sensor in the vehicle;

processing the energy consumption data and the emissions data as a function of the mileage data to calculate results, the results comprising an efficiency rating based on a real time fuel utilization controlled by fuel conserving and emissions reduction technology of the vehicle;

transmitting the results of the processing to a data collection system;

receiving aggregate performance data from the data collection system, the aggregate performance data representing an aggregation of energy consumption data processed for multiple vehicles;

generating a report on amount of green house gas reduced by the vehicle based on the results and the aggregate performance data, the report relating the efficiency rating to the aggregate performance data to inform a vehicle operator of a usage consumption relative to a calculated average across the multiple vehicles, the report comprises vehicle manufacturer and model data with respect to the aggregate performance data and the results; and displaying the report on a display in the vehicle.

15. The computer program product of claim 14, wherein the in-vehicle energy source sensor is one of a petroleum-based and a diesel-based fuel sensor.

16. The computer program product of claim 14, wherein the in-vehicle energy source sensor is an electric motor control unit.

17. The computer program product of claim 14, wherein the in-vehicle energy source sensor is an alternate fuel sensor.

18. The computer program product of claim 14, wherein the method further comprises:

displaying the results and the efficiency rating on a display in the vehicle.

19. The computer program product of claim 14, wherein collecting the energy consumption data, the emissions data, and the mileage data further includes downloading the energy consumption data, the emissions data, and the mileage data from a vehicle diagnostic system communicatively coupled to the vehicle; and wherein displaying the report to a display in the vehicle is performed in response to receiving the energy consumption data, the emissions data, and the mileage data from the vehicle diagnostic system.

* * * * *